Figure 1:
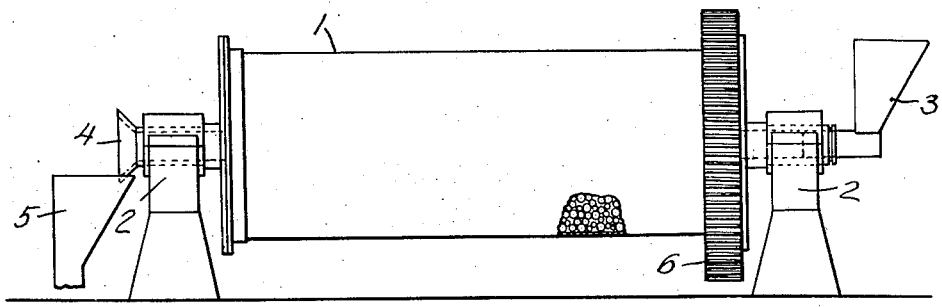

May 26, 1931.  G. H. CARNAHAN  1,807,383
GRINDING METHOD AND APPARATUS
Filed Sept. 29, 1928

George H Carnahan  INVENTOR
BY
Pennie Davis Marvin Edmonds,
ATTORNEYS

Patented May 26, 1931 1,807,383

UNITED STATES PATENT OFFICE

GEORGE HOLMES CARNAHAN, OF NEW YORK, N. Y., ASSIGNOR, BY MESNE ASSIGNMENTS, TO RUBBER SURFACERS, INC., OF WILMINGTON, DELAWARE, A CORPORATION OF DELAWARE

GRINDING METHOD AND APPARATUS

Application filed September 29, 1928. Serial No. 309,363.

This invention relates to improvements in grinding methods and apparatus, and more particularly to improvements in grinding operations carried out in ball mills or tube mills.

In grinding operations heretofore carried out in ball mills or tube mills, hard surfaced grinding media have been employed, and flint pebbles have been extensively employed for this purpose. In order that the flint pebbles may have sufficient weight to be effective, the pebbles employed are relatively large, around three inches in diameter. Iron or other metal balls have been employed in some cases, but their application is limited, and they cannot be employed when the materials being ground are corrosive or act upon the metal, nor can they be employed where metallic contamination resulting from the abrading of the metal balls must be avoided. Such balls, whether of metal or of flint, have hard grinding surfaces and are in contact with each other only at isolated points, and since the grinding action is primarily a surface action, the grinding is for the most part limited to the several points of contact between the abrasive pebbles or balls.

The present invention provides an improved method of grinding in which the grinding media have resilient surfaces so that adjacent balls will have a substantial surface contact with each other. The grinding media which I employ have a resilient rubber surface but have a sufficient weight and density to accomplish the necessary grinding action.

Where the rubber balls employed as grinding media, according to the present invention, are not required to have a specific gravity materially greater than that of flint, the balls may be made up entirely of a rubber composition containing a relatively large amount of a heavy filler compounded therewith, such as litharge, so that the rubber compound, when vulcanized, will have a specific gravity of around 2.6 or greater. By using a heavy filling material like litharge in sufficient amount, a specific gravity can be increased to around 3 or in some cases even more without seriously affecting the wearing qualities of the vulcanized rubber composition. The rubber composition employed should have high abrasive resisting properties, particularly at its outer wearing surfaces. It is not so important to have the center of solid rubber balls so resistant, and in some cases the balls may be of a composite character, with a heavy rubber composition in the center, and with a special composition on the exterior capable of withstanding the necessary wear and abrasion. Compositions of the nature of tread stocks for automobile tires are well suited for use for the outsides of such balls, but in order to impart to the balls a sufficient specific gravity, it is important for a sufficient amount of a heavy filler like litharge to be incorporated in the rubber before it is vulcanized.

Instead of employing balls made entirely of rubber composition, it is more advantageous to employ balls with metal centers and with the rubber covering surrounding the same. The metal centers may be made of different metals but a specially high specific gravity can be obtained by using a metal made up of about 90% lead and 10% antimony and which has a specific gravity of around 10.9. The hardening effect of the antimony on the lead will prevent distortion of the metal core. Such metal cores will be covered with a layer of rubber which may be for example, about $\frac{1}{8}$ or $\frac{3}{16}$ inch in thickness. The rubber coating will be applied to the metal cores and vulcanized thereon to form an integral ball structure. For this purpose, a tough rubber compound should be employed, such as is employed in the threads of automobile tires, and which will be capable of withstanding prolonged use for grinding purposes.

Instead of making the balls or rods of uniform size, they are more advantageously made of different sizes in order to induce a differential or rubbing effect between balls or rods of different sizes in the operation of the ball mill or rod mill. The metal cores may, for example, be cast in at least three different diameters, and then coated with the rubber casing of tough rubber, for example, of $\frac{1}{8}$ or $\frac{3}{16}$ inch in thickness. If, for example, the cores are cast of diameters of 1 inch, 1$\frac{1}{4}$ inches and 1$\frac{1}{2}$ inches and if a layer of tough rubber compound of approximately ⅛ inch is applied thereto, the diameter of the finished balls would be increased by ¼ inch each by the rubber coating, giving balls of 1¼ inches, 1½ inches and 1¾ inches diameter respectively.

The specific gravity of the rubber coating may be, for example, around 1.45, but the ball as a whole will still have a radically higher specific gravity than that of flint pebbles, for example, around 6, or about 2⅓ times the specific gravity of flint. It will be evident that the specific gravity of the ball as a whole will vary with the thickness of the rubber layer and the diameter of the metal core, and also with the composition of the metal core.

In employing such grinding media and in carrying out the grinding operation therewith, ball mills or tube mills such as are commonly employed with flint pebbles may be employed, but with the flint pebbles replaced by the new grinding media. The ball mills may thus be metal ball mills with a lining which may be a metallic lining or a silex or porcelain lining, or a rubber lining. The use of rubber lined mills has important advantages for certain purposes, but the present invention, in its broader aspects, includes the use of mills of various kinds and with linings of different materials.

In the carrying out of the grinding operation with many materials, the employment of the grinding media of the present invention, with their resilient surfaces, have important advantages. Instead of presenting only a point of contact with each other, as in the case of grinding balls with hard surfaces, the grinding balls of the present invention are flattened somewhat where they come in contact with each other, because of the resilient character of the rubber coating or of the heavy rubber ball employed. This flattening of the rubber surfaces under pressure and superimposed weight provides substantial working areas between the adjacent balls, so that the working area which is accomplishing the grinding is vastly increased. Rubber working against rubber does not slide with ease, and therefore the action is somewhat more of a tearing action than a pounding action. The tearing apart of the structure of the materials being ground is induced not only by the pulling friction between the rubber surfaces but also by the differential surface speeds where the balls are of different diameter.

The greatly increased density of the balls, where a metal core is employed, enables smaller balls to be employed. The smaller balls have a greatly increased surface for an equal volume of charge, but their units of weight are nevertheless sufficiently great to be effective.

Accordingly, with the new grinding media, there can be obtained a greatly increased grinding action, due to the greatly increased area of contact between the balls, to the enhanced friction between the balls, and the increased area of surface of the balls for a given volume, because of their smaller size and their greater weight. The balls can be employed in mills of the present diameter and speed but advantage may be taken of their greater area, their smaller size, and their greater effectiveness per unit volume by employing them in mills of lesser diameter. With the new grinding media, employed in mills of the size now employed, a greatly increased grinding effect can be obtained, as compared with the use of flint pebbles; while the same grinding effect can be obtained in a mill of smaller size.

The employment of mills of smaller size, with the new grinding media, enables substantial economies to be obtained in power costs of the grinding operation. The horse power expended in driving revolving ball mills increases as the square of the radius, so that smaller mills can be operated at substantially less power cost than larger mills.

The grinding operation of the present invention is further promoted by the greater specific gravity of the grinding balls employed, and the greater effective weight of the balls. For example, in grinding wet materials where the balls are submerged in water, the effective weight of the balls is only the difference between the weight of the balls and the weight of an equal volume of water. With flint pebbles, the effective difference in specific gravity is only about 1.5 as against 5 or 6 in the case of the heavy rubber covered balls of the present invention.

In carrying out the grinding operation, the materials to be ground can be charged into the mill, and the ground material discharged therefrom, in much the same manner as at present with mills employing flint pebbles; and the grinding operation can be regulated by regulating the flow and to some extent by the speed of operation, etc. The rate at which the mill is revolved should be such as to prevent slippage. Slippage between the walls of the mill and the grinding media can be eliminated by suitably adjusting the peripheral speed of the mill.

The resilient rubber surface greatly increases the area of contact between lining and balls, thus permitting a reduction in peripheral speed without slippage with corresponding saving of power.

The improved grinding process of the present invention is of more or less general application for grinding operations where the material to be ground does not require hard grinding surfaces. The process can thus be employed for grinding vegetative material where it is desired for any reason to rupture the individual cells and destroy or break down the cellular or fibrous structure, or to separate individual fibres from each other, and this is especially true where it is possible to use water during the grinding operation, or a liquid which is not a solvent for rubber. The process can also be used to advantage in grinding certain inorganic materials which readily disintegrate, such as certain paint pigments such as those which are ground in the presence of water.

A particularly valuable application of the process is in the production and treatment of wood pulp and other fibrous pulps. Wood which has been softened by treatment with steam or with chemicals which soften the inter-fibrous ingredients so that the softened chips can then be ground or disintegrated to form a fibrous pulp, can advantageously be subjected to such grinding and pulping operation by the improved process of the present invention. Partially cooked wood pulp or wood chips, with the individual fibres still connected with softened cementing materials can be further disintegrated and ground and converted into a pulp by grinding according to the improved process of the present invention. Even where the pulp has been produced by the chemical cooking of wood or other material, the resulting cooked chips or pulp can be subjected to a further refining treatment by subjecting the same to further grinding with the improved grinding media and apparatus and according to the improved process of the present invention. This further grinding operation may replace, in whole or in part, the further refining to which pulp is now subjected in beaters, or in Jordan mills, or both. The action of the rubber surfaces of the balls upon the paper pulp, or upon the fibres which are to be reduced to the condition of a pulp, is a combined rubbing, squeezing and tearing action which results in the tearing apart of the individual fibres and the refining of the pulp. The resilient character of the rubber surfaces provides substantial areas of contact between the adjacent balls, while with balls of different sizes and with the resulting differential surface speeds of the balls, the pulling friction between the rubber surfaces is increased, and an increased tearing apart of the plant structure is induced. The vegetable material is moreover subjected to sufficient pressure, combined with the tearing and friction, to reduce the material to a disintegrated condition, without, however, injuring the material to any such extent as might be caused by the employment of grinding balls with hard wearing surfaces.

The employment of the balls with rubber surfaces has the further important advantage of preventing contamination of the ground material by particles of metal or of flint. Abraded metal or sand or slimes from the abraded flint rock can be eliminated. It is evident that the rubber compound employed should be one which is resistant to the action of whatever liquid may be present admixed with the material being ground; and that where the material acts too injuriously upon the rubber surfaces, material cannot to advantage be ground according to the present process.

The improved grinding process of the present invention can be applied for other purposes such as the grinding of vegetable materials for the production of drugs, or the extraction of drugs, or the disintegration or extraction of various materials which require a grinding operation. So also, vegetable materials such as starch, etc. which must be prepared in a finely divided state can advantageously be ground by the present process. Slimes or colloidal suspensions can also be readily prepared; and different materials can be admixed with each other during the grinding operation, for example, yeast or bacteria can be ground with starch to produce a material well adapted for use for fermentation purposes.

Decortication can also be carried out according to the present process, for example, where it is desirable to remove an outer covering which is much softer than a harder interior woody structure.

The present process is particularly advantageous in its application to the extraction of rubber from rubber bearing plants such as the guayule plant, but this process is more specifically described and claimed in my companion application, Serial No. 309,364, filed of even date.

An apparatus adapted for the practice of the present process is shown in the accompanying drawings, the ball mill or tube mill itself being shown conventionally, with a conventional inlet and outlet. It will be evident that the ball mill or tube mill may be of different sizes and dimensions and may have suitable inlet and outlet connections which will differ somewhat with the different materials being ground or disintegrated therein.

In the accompanying drawings

Figure 2:
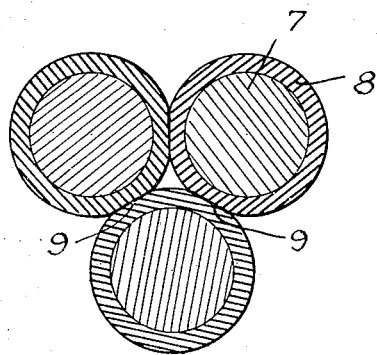

Fig. 1 shows the mill with part of the shell cut away, and Fig. 2 shows three rubber covered balls in central section pressed against each other.

The drum 1 of the ball mill or tube mill is supported by suitable standards or supports 2 and has an inlet 3 and outlet 4, shown conventionally, the outlet discharging into a spout 5. The mill is rotated in the usual way, as by a gear 6, and a cooperating driving gear (not shown).

Within the ball mill or tube mill is a charge of rubber covered balls, as shown conventionally in Fig. 1 where part of the shell of the drum is cut away. Three of the balls are shown in pencil cross-section in Fig. 2. each ball being made up of a core 7 of dense heavy metal with resilient rubber surfaces or layers 8 of substantial thickness surrounding the heavy metal cores. The three balls shown in Fig. 2 have a substantial area of contact with each other as indicated at 9, this flattened area of contact varying in practice with the pressure exerted by the balls against each other.

In the operation of the mill and the carrying out of the process, the rotation of the mill will cause the balls to be raised and to roll or fall down over each other, and, where the balls impact against each other, or where they are forced together by the weight of the balls, they will have flattened surfaces, which flattened surfaces will, however, continually change with the rotation of the mill and the changed positions of the balls. The material undergoing grinding or disintegration will be subjected to the grinding and disintegrating action of the flattened surfaces which are of a resilient character and which have a very substantial area, as compared with the very limited area of contact of metal or other non-resilient balls.

It will thus be seen that the present invention provides an improved grinding process in which the grinding operation is carried out with media having resilient rubber surfaces, but having a sufficient density to enable effective grinding to be obtained. It will further be seen that the grinding operation with such grinding media has important advantages, such as the greatly increased surface contact between the adjacent balls, the increased tearing action which such increased surfaces impart, and which is further improved by the differential action of balls of different sizes, etc. From the apparatus standpoint, it will be seen that the invention provides new grinding media both in the form of heavy solid rubber balls, and heavy metal balls provided with rubber covering; and that these balls can be made much smaller in size than flint pebbles, particularly in the case of the metal balls with rubber covering, with resulting advantage in the cost of operation and in the size of grinding mills required. The new grinding media itself also forms a part of the invention, as well as the grinding mills in which such media is employed, and the improved grinding process carried out therewith.

I claim:

1. The improved method of grinding or disintegrating materials in ball mills or tube mills which comprises subjecting the same to the action of grinding balls having resilient rubber wearing surfaces which flatten under pressure where the balls come into contact with each other, the resilient surfaces of said balls being of substantial thickness and the heavy metal core being of sufficient weight to cause the balls to flatten where they come in contact with each other during the grinding operation, whereby the resilient surfaces have substantial surface areas in contact with each other during the grinding operation.

2. The improved method of grinding or disintegrating materials in ball mills or tube mills which comprises subjecting the same to the action of grinding media made up of balls having a resilient rubber wearing surface and having a dense core of heavy metal, the resilient surfaces of said balls being of substantial thickness and the heavy metal core being of sufficient weight to cause the balls to flatten where they come in contact with each other during the grinding operation, whereby the resilient surfaces have substantial surface areas in contact with each other during the grinding operation.

3. The method of grinding or disintegrating vegetable or plant materials in ball mills or tube mills which comprises subjecting the same in the presence of water to the grinding or disintegrating action of grinding balls having resilient rubber wearing surfaces and having a sufficient density to effect the grinding or disintegrating treatment, the resilient surfaces of said balls being of substantial thickness and the heavy metal core being of sufficient weight to cause the balls to flatten where they come in contact with each other during the grinding operation, whereby the resilient surfaces have substantial surface areas in contact with each other during the grinding operation.

4. An improved grinding or disintegrating apparatus comprising a ball mill or tube mill having therein grinding balls having resilient rubber wearing surfaces and having a high specific gravity comparable with or greater than that of flint pebbles, the resilient surfaces being of substantial thickness such that the balls are flattened and have a substantial surface contact with each other during their use as grinding elements in a ball mill.

5. An improved grinding or disintegrating apparatus comprising a ball mill or tube mill having therein grinding balls made up of heavy metal cores surrounded with resilient rubber wearing surfaces, the resilient surfaces being of substantial thickness such that the balls are flattened and have a substantial surface contact with each other during their use as grinding elements in a ball mill.

6. Grinding balls for use in ball mills and tube mills having resilient rubber wearing surfaces and having a specific gravity comparable with or greater than that of flint pebbles, the resilient surfaces being of substantial thickness such that the balls are flattened and have a substantial surface contact with each other during their use as grinding elements in a ball mill.

7. Grinding balls for use in ball mills and tube mills having resilient rubber wearing surfaces and having a metal core of high specific gravity, the resilient surfaces being of substantial thickness such that the balls are flattened and have a substantial surface contact with each other during their use as grinding elements in a ball mill.

8. Grinding or disintegrating media for ball mills or tube mills comprising a body of balls of varying sizes and diameters, the balls of each size being made up of a dense metal core and an outer resilient layer of rubber providing a resilient wearing surface for the balls, the varying diameters of the balls giving a differential surface movement of the balls during their use in ball mills or tube mills, the resilient surfaces being of substantial thickness such that the balls are flattened and have a substantial surface contact with each other during their use as grinding elements in a ball mill.

9. An improved grinding or disintegrating apparatus comprising a ball mill or tube mill having therein a body of small balls of varying diameters provided with resilient rubber wearing surfaces and having central cores of heavy dense metal, whereby the balls of different sizes have a differential surface motion with respect to each other during the operation of the ball mill or tube mill, the resilient surfaces being of substantial thickness such that the balls are flattened and have a substantial surface contact with each other during their use as grinding elements in a ball mill.

In testimony whereof I affix my signature.

GEORGE HOLMES CARNAHAN.